United States Patent
Gao (10) Patent No.: US 8,005,471 B2
(45) Date of Patent: Aug. 23, 2011

(54) ACCESS NETWORK BROADCAST CONTROL-SIGNALING CHANNEL

(75) Inventor: Mingshen Gao, Batavia, IL (US)

(73) Assignee: Alcatel Lucent, Paris (FR)

( * ) Notice: Subject to any disclaimer, the term of this patent is extended or adjusted under 35 U.S.C. 154(b) by 1115 days.

(21) Appl. No.: 11/496,942

(22) Filed: Jul. 31, 2006

(65) Prior Publication Data
US 2008/0026715 A1    Jan. 31, 2008

(51) Int. Cl.
*H04Q 7/20* (2006.01)

(52) U.S. Cl. ............... 455/422.1; 455/414.1; 455/458; 455/450; 455/452.1; 370/390; 370/206; 370/329; 370/341; 370/328

(58) Field of Classification Search ............ 455/422.1; 370/328
See application file for complete search history.

(56) References Cited

U.S. PATENT DOCUMENTS

| | | | |
|---|---|---|---|
| 2005/0054331 A1* | 3/2005 | Balachandran et al. | 455/414.1 |
| 2005/0201321 A1* | 9/2005 | Sinnarajah et al. | 370/328 |
| 2006/0098567 A1* | 5/2006 | Willenegger et al. | 370/206 |

FOREIGN PATENT DOCUMENTS

| | | |
|---|---|---|
| EP | 1 353 523 | 10/2003 |
| EP | 1 501 328 | 1/2005 |
| EP | 1 513 368 | 3/2005 |

OTHER PUBLICATIONS

3GPP2: C.S0054, Version 1.0; CDMA2000 High Rate Broadcast;Multicast Packet Data Air Interface Specification; Internet Citation; Feb. 2004; Chapter 1.4 Broadcast Channels; Organizational Partners, USA.

* cited by examiner

*Primary Examiner* — Charles N Appiah
*Assistant Examiner* — Randy Peaches
(74) *Attorney, Agent, or Firm* — Carmen Patti Law Group, LLC (57) ABSTRACT

An access network of an apparatus in one example is configured to provide a wireless communication service over a coverage area and is configured to support a broadcast multicast system (BCMCS). The access network is configured to broadcast at least one broadcast control-signaling channel (BCC) over the coverage area via at least one BCMCS flow. Each of the at least one BCMCS flow is identified by a flow identifier. The access network is configured to select, based at least in part on a flow identifier registration by an access terminal, a selected BCC of the at least one BCC or another control channel for sending a signaling message to the access terminal.

17 Claims, 4 Drawing Sheets

ACCESS NETWORK BROADCAST CONTROL-SIGNALING CHANNEL

TECHNICAL FIELD

The invention relates generally to wireless communication and more particularly to wireless signaling in an access network.

BACKGROUND

Wireless service providers that offer voice over internet protocol (VOIP) and push-to-talk (PTT) services are starting to move these and other real-time applications and services to a converged evolution-data optimized (EV-DO) based radio access network (RAN) from their current 1X based radio access network. All the signaling messages for an idle access terminal (AT) in an EV-DO based RAN go through a ControlChannel (CC) and are transmitted across many sectors. For example, a RouteUpdateRequest message sent by the access network (AN) to the entire radio network controller's (RNC) coverage area for finding an AT's current location which may be followed by the AN sending another message such a DOS (data over signaling) message to several sectors in which the AT has good pilot signal strength. The DOS message may carry call-setup related information or an instance short message, once the access terminal returns the requested RouteUpdate message. Traditional paging strategy sends a page message to a last seen active-set in a first attempt to contact the access terminal, escalates to an entire RNC's coverage area in the next attempt, and is followed with a page to an RNC group that combines a few adjacent RNCs. For RNCs with about 50-cells/150-sectors, nearly 50 sectors on average may be involved in transmitting page messages for each call, assuming a 70%-75% success rate for the first attempt and 24%-29% for the second attempt within RNC, and just 1% for the third attempt to the RNC group. The success rate of the attempts to page the access terminal are a good indication of overall average response time for call setup within the RAN. One way to improve the success rate for the first page (it is only about 60%-80% for this traditional page strategy) is to page the entire 150 sectors in the RNC in the first attempt. However, this may use too large of an amount of network resources during a busy hour for an EVDO based RAN since it does not have a dedicated paging channel which is the case for the 1X based RAN.

It is desirable to reduce a response time for real-time applications (e.g., using data over signaling, DOS). However, in the EVDO RAN, the CC can transmit no more than 16 bytes of physical layer data in each time-slots at its highest rate of 76.8 kbps. Accordingly, a 100 byte general 'compressed SIP invite' (call-setup message) will take 7 times-slots for the CC to transmit. Since an EVDO based RAN delivers high-speed service based on its high-speed traffic/broadcast channels, time-slots used by the slower control channels will degrade the overall system performance.

At 1.2K busy hour call attempts (BHCA) per sector (35Erlang with 100 seconds hold time) for EVDO based RAN, a RNC with 50-cells/150-sectors will transmit more than 5 page messages per ControlChannelCycle (CCcycle) from every sector, assuming the traditional paging strategy is performed. It will be approximately 20-25 page messages per CCcycle if the entire RNC coverage area is paged at the first attempt for better result as it is often the customary way for 1X based RAN. With this rate, the system simply cannot afford to convert some of the page messages to DOS messages (data over signaling) for passing the call-setup information directly to the users as the real-time applications (such as PTT services) would like to do.

Using a zone base method for tracking users (e.g., using the RouteUpdateTriggerCode for zones as small as one or a few sectors) will limit the number of sectors participating for transmitting signaling messages so that some CC cycles can be saved from air interface resources. But for small zones, access terminals that are approximately stationary near the zone boundaries could often "ping-pong" between the zones as they are toggling between sectors that belong to different zones. In this case, while some CC cycles have been saved, it places an additional load on the Access Channels (AC), which could be very heavy such that the overall system's accessing ability will be impacted.

Thus, a need exists for an increase in signaling performance and efficient use of air interface resources.

SUMMARY

The invention in one implementation encompasses an apparatus. The apparatus comprises an access network configured to provide a wireless communication service over a coverage area and is configured to support a broadcast multicast system (BCMCS). The access network is configured to broadcast at least one broadcast control-signaling channel (BCC) over the coverage area via at least one BCMCS flow. Each of the at least one BCMCS flow is identified by a flow identifier. The access network is configured to select, based at least in part on a flow identifier registration by an access terminal, a selected BCC of the at least one BCC or another control channel for sending a signaling message to the access terminal.

Another implementation of the invention encompasses an apparatus. An access terminal is configured to receive a wireless communication service from an access network. The access network is configured to support a broadcast multicast system (BCMCS). The access terminal is located within a coverage broadcast signaling zone of the access network. The access terminal is configured to receive a broadcast overhead message that comprises at least one BCMCS flow identifier. The BCMCS flow identifier comprises a first BCMCS flow identifier that corresponds to the coverage broadcast signaling zone. The access terminal is configured to register the first BCMCS flow identifier. The access terminal is configured to receive a signaling message over a BCC via a BCMCS flow identified by the first BCMCS flow identifier.

A further implementation of the invention encompasses a method. A coverage area of an access network that supports a broadcast multicast system (BCMCS) is divided into a plurality of coverage broadcast signaling zones. Each coverage broadcast signaling zone comprises an assigned broadcast signaling zone. A unique zone identifier and a flow identifier are assigned to each assigned broadcast signaling zone. A coverage broadcast signaling zone that an access terminal is located within is determined based on a flow identifier registration by the access terminal. A signaling message is sent to the access terminal over a broadcast control-signaling channel to the coverage broadcast signaling zone via a BCMCS flow. The BCMCS flow is identified by the flow identifier registration.

DESCRIPTION OF THE DRAWINGS

Features of example implementations of the invention will become apparent from the description, the claims, and the accompanying drawings in which:

DETAILED DESCRIPTION

Figure 1:
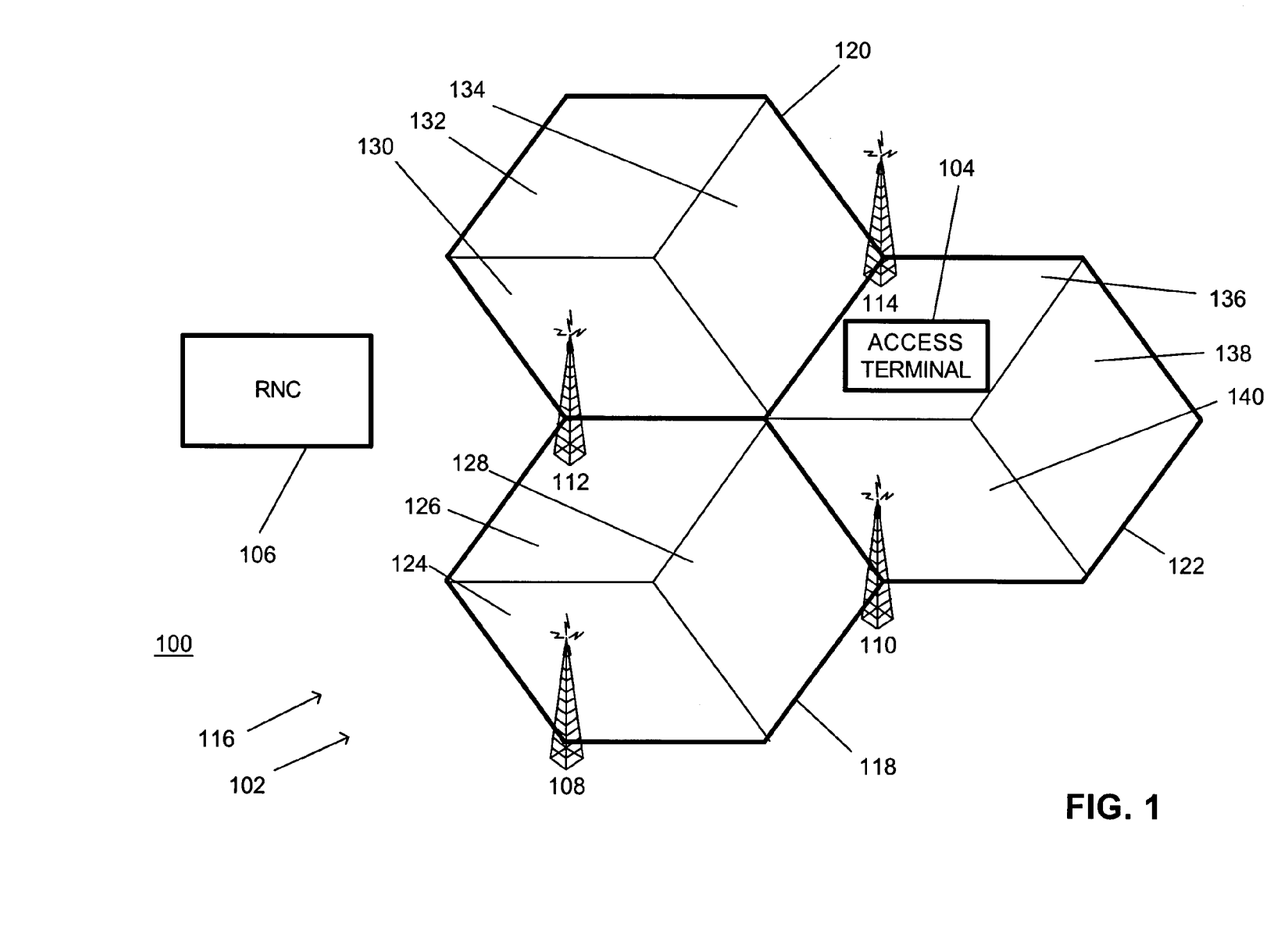
FIG. 1 is a representation of one implementation of an apparatus that comprises an access network and an access terminal.

Turning to FIG. 1, an apparatus 100 in one embodiment comprises an access network 102 and an access terminal (AT) 104. The access network 102 in one example comprises an evolution data optimized (EVDO) wireless communication network. The standard specification for an EVDO network is described in "CDMA2000 High Rate Packet Data Air Interface Specification" (3GPP2 document C.S0024). The access network 102 in one example comprises a radio network controller 106 and a plurality of base transceiver stations (BTS) 108, 110, 112, and 114. The access network 102 provides a wireless communication service to the access terminal 104 over a coverage area 116. The access network 102 in one example provides a broadcast multicast service (BCMCS) or enhanced BCMCS (EBCMCS) to the access terminal 104 in the coverage area 116. The standard specification for a BCMCS air interface is described in "CDMA2000 High Rate Broadcast-Multicast Packet Data Air Interface Specification" (3GPP2 document C.S0054).

The coverage area 116 in one example comprises a plurality of cells 118, 120, and 122 that subdivide the coverage area 116. In a further example, the cells 118, 120, and 122 are further subdivided into a plurality of sectors, for example, three or six sectors per cell. In the example of FIG. 1: cell 118 comprises sectors 124, 126, and 128; cell 120 comprises sectors 130, 132, and 134; and cell 122 comprises sectors 136, 138, and 140. The BTSs in one example cooperate to provide the wireless communication service over the plurality of cells. For example, BTS 108 communicates over sector 124, BTS 110 communicates over sector 128, and BTS 112 communicates over sector 126 to provide service to the cell 118.

Figure 2:
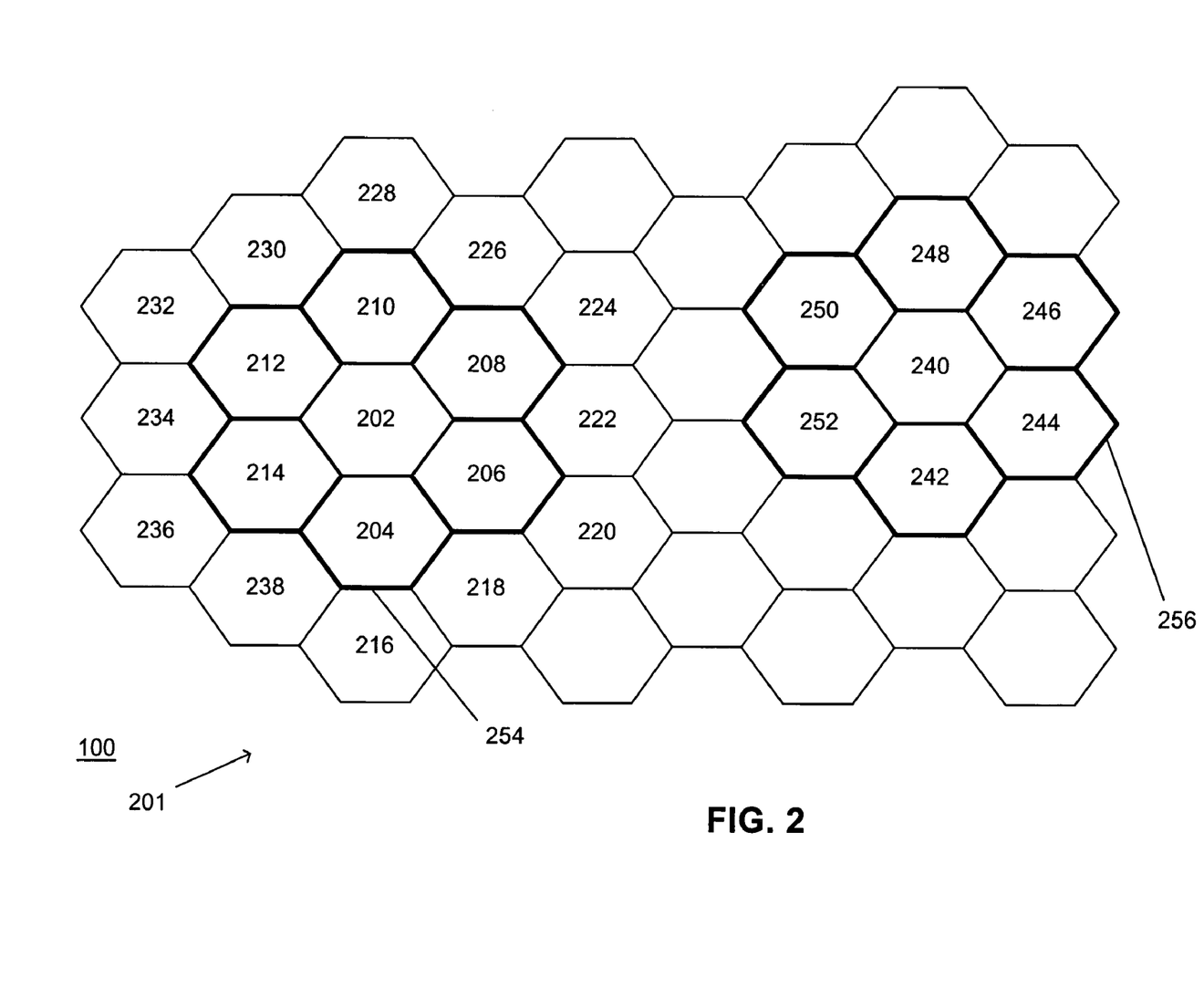
FIG. 2 is a representation of one implementation of a plurality of cells of the access network of FIG. 1 and illustrates assigned broadcast signaling zones and coverage broadcast signaling zones.

Turning to FIG. 2, another implementation of a coverage area 201 serviced by the access network 102 in one example is divided into a plurality of sectors, where each sector is represented by a hexagon. For example, the coverage area 201 comprises sectors 202 through 252 (additional sectors shown are not numbered for clarity). The sectors of the coverage area 201 are organized into coverage broadcast signaling zones (CBSZs) and assigned broadcast signaling zones (ABSZs). Each zone comprises an associated pair, ABSZ and CBSZ, that is identified by a unique zone identifier. Each ABSZ is also assigned with a BCMCS flow identified by a BCMCS flow identifier available to the coverage area, as described herein. The ABSZs in one example do not overlap and each ABSZ is covered by a CBSZ. The CBSZ in one example comprises the ABSZ and the sectors that surround the ABSZ. In a further example, the CBSZ comprises the ABSZ and at least one "layer" of sectors that surround the ABSZ.

Referring to FIG. 2, the coverage area 201 in one example is divided into a plurality of ABSZs where each ABSZ is a sector. Each ABSZ is associated with a CBSZ, but only CBSZ 254 and CBSZ 256 are shown for clarity. The CBSZ 254 comprises sectors 202, 204, 206, 208, 210, 212, and 214 where sector 202 is its associated ABSZ. The sectors 204, 206, 208, 210, 212, and 214 comprise a first layer of sectors that surround the ABSZ 202. A second layer of sectors that surrounds the zone 202 comprises sectors 216, 218, 220, 222, 224, 226, 228, 230, 232, 234, 236, and 238. In an alternative example, the CBSZ may comprise the ABSZ, the first layer of sectors that surround the ABSZ, and the second layer of sectors that surround the ABSZ. CBSZ 256 in one example comprises sectors 240, 242, 244, 246, 248, 250, and 252 where sector 240 is the associated ABSZ.

The ABSZs completely cover the coverage area 201 with no overlap among ABSZs and the CBSZs comprise the first layer of sectors that surround the corresponding ABSZ. The first layer of sectors that surround the ABSZ 202 comprise sectors 204, 206, 208, 210, 212, and 214. The first layer of sectors that surround the ABSZ 206 comprise sectors 218, 220, 222, 208, 202, and 204. In this example, a CBSZ for zone 202 partially overlaps a CBSZ for zone 206. In this configuration, the overlapped areas for the CBSZs comprise soft zone boundaries, which will create a single frequency network (SFN) effect for ATs in the zone for achieving high data rate signaling and which will be used to protect access channel from toggling by stationary ATs near the zone boundary.

The access network 102 in one example is configured to broadcast at least one broadcast control-signaling channel (BCC) to the coverage area 201. In one example, the access network 102 is configured to broadcast one BCC per ABSZ. Each ABSZ in one example is assigned with a completely independent and localized broadcasting-multicasting (BCMCS) flow. The access network employs the BCCs for passing control-signaling messages to an access terminal in or just slightly outside the ABSZ so that it appears to be or behaves like a broadcasting channel carrying the control-signaling messages. The access network 102 in one example comprises a BCMCS program (e.g., named as BCCs-over-BSZs) for creation of the BCC BCMCS flows, where all the available BCMCS flow identifiers to the coverage area are considered as a BCMCS flow under the BCMCS program.

The current BCMCS standard specification allows for up to 64 BCMCS flows for each BCMCS program and the air interface allows only up to 64 BCMCS physical channels. In one example for this apparatus, each BCC will be directly associated with one of the possible BCMCS physical channel. In this way, we can use a 6-bit flow discriminator, which is the lowest 6 bits in the standard format for BCMCSFlowID structure, to uniquely identify each and every possible BCCs (each BCC in one example is an independent localized BCMCS flow, such that it has a complete BCMCS flow identifier, the assigned BCMCSFlowID structure. But for our purpose, only enough of bits for the flow discriminator in BCMCSFlowID will be used to identify a BCC). If the coverage area 201 comprises more than 64 zones or if it is desirable to use fewer than 64 flows, the access network 102 will have to reuse the BCMCS flow identifiers since each BCMCS flow identifier here specifies an actual BCMCS physical channel and maps to a fixed time-slot with the fundamental ControlChannel-Cycle. The access network 102 in one example assigns a BCMCS flow identifier to each ABSZ, but it also reuses the BCMCS flow identifiers for ABSZs that are distant enough from each other when the cross-interference between the BCCs can be ignored. Referring to FIG. 2, the access network 102 in one example reuses a same flow identifier for the zone 202 (the ABSZ for CBSZ 254) and zone 240 (the ABSZ for CBSZ 256).

The access network 102 in one example employs the BCCs for sending signaling messages to the access terminal 104. The BCC in one example comprises a supplementary signaling route to the access terminal 104, in addition to a standard signaling route using the control channel. In an EVDO based network, the control channel (CC) comprises limited bandwidth, for example, it can transmit no more than 16 bytes of physical layer data in each time-slot at its highest rate of 76.8 kilobits per second (kbps). A BCMCS flow in one example allows for data packets of up to 2 k bits and transfer speeds up to 1.2 megabits per second (Mbps). Where the access network 102 employs the BCC over the BCMCS flow for sending signaling messages, a much higher data rate (e.g., 16 or 24 times) may be achieved as compared to the standard EVDO control channel based signaling.

Since the BCMCS flow allows for higher bandwidth, the access network 102 in one example can more efficiently employ the data over signaling (DOS) protocol to send messages to the access terminal. The access network 102 in one example sends a 'compressed SIP invite' type of call-setup message to the access terminal for real-time applications such as voice over internet protocol (VOIP) or push-to-talk (PTT) to speed up a session setup process for the application as it bypasses the paging process entirely. The access network 102 in one example use the DOS protocol for sending call-setup related information to the access terminal 104 to speed up information (small in size) delivery. In one example, the access network 102 comprises a multi-carrier configuration, for example, the access network comprises at least a first and a second carrier. In this configuration, the access network 102 may use the BCC to send many or all of the best effort (BE) messages for each of the carriers (e.g., the first and second carriers). Examples of best effort messages comprise RouteUpdateRequest messages, DOS (data over signaling) messages, and page messages.

In one example, the access network 102 puts a plurality of signaling messages for a plurality of access terminals such as 104 in the data packet since the data packet is 16 to 24 times larger than the 128 bits transferred by the normal control channel in each time slot. The access network 102 in another example employs an R-S coding (described by the BCMCS specification) to the data packets of the BCC to add error correction capability to improve the bit-error rate for transmission. If the entire data packet of the BCMCS flow for a time-slot is not utilized for signaling messages to the access terminals such as 104, the access network 102 in yet another example duplicates the signaling messages for redundancy in consecutive cycles. Although the example of FIG. 2 shows that each zone (the ABSZ) comprises a sector, in practice, a zone (the ABSZ) can comprise any of: one sector; a plurality of sectors; one cell; a plurality of cells; or one radio access network (more practically, all the sectors within the RNC that are one sector deep inside make up the ABSZ so that the CBSZ itself is the entire RNC).

Figure 3:
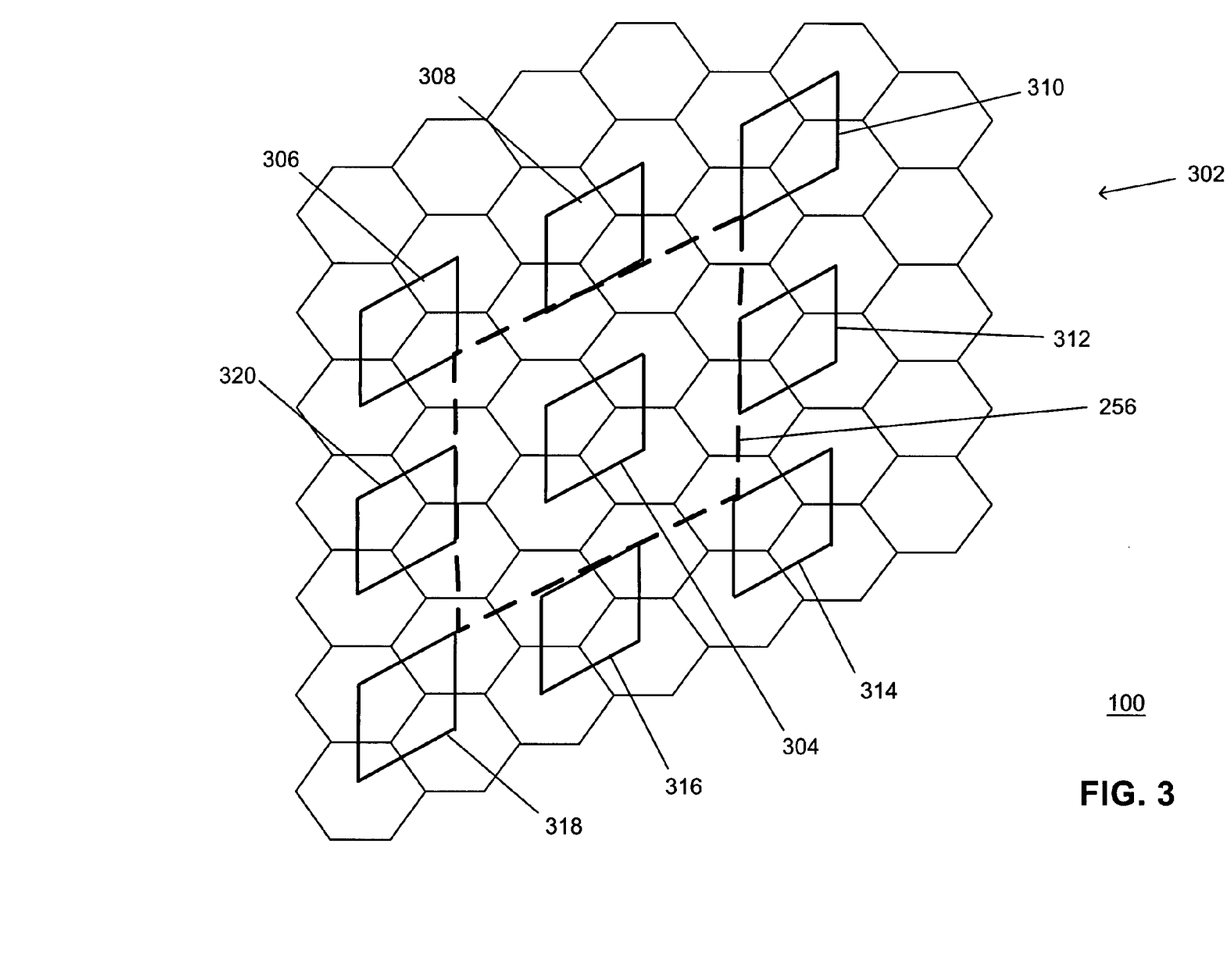
FIG. 3 is a representation of another implementation of the assigned broadcast signaling zones and coverage broadcast signaling zones of FIG. 2.

Turning to FIG. 3, another implementation of a coverage area 302 serviced by the access network 102 is shown. In FIG. 3, the hexagons represent individual sectors, similar to sectors 202 through 252 of FIG. 2, but are not numbered for clarity. Coverage area 302 in one example comprises ABSZs 304, 306, 308, 310, 312, 314, 316, 318, and 320, each comprising four sectors and represented by a parallelogram that passes through the four sectors. The CBSZ for each ABSZ of FIG. 3 comprises the ABSZ and a first layer of sectors that surround the ABSZ. The ABSZ 304 corresponds to the CBSZ 256, represented by a parallelogram that passes through twelve sectors of the first layer of sectors that surround the ABSZ 304.

Referring to FIG. 3, the coverage area 302 comprises nine ABSZs 304 through 320. The access network 102 in one example assigns nine different flow identifiers to the nine ABSZs 304 through 320, for example, BCC1, BCC2, BCC3, BCC4, BCC5, BCC6, BCC7, BCC8, and BCC9. The coverage area 302 in a further example comprises additional instances of the nine ABSZs 304 through 320 to fully cover the coverage area 302. In this example, each additional instance of the nine ABSZs structure reuses the flow identifiers BCC1 through BCC9. The ABSZs 306, 308, 310, 312, 314, 318, and 318 provide a buffer area to separate multiple instances of the ABSZ 304 that use the same BCC1 from interfering with other ABSZs that are also using the same BCC1 BCMCS flow identifier, as will be appreciated by those skilled in the art.

Figure 4:
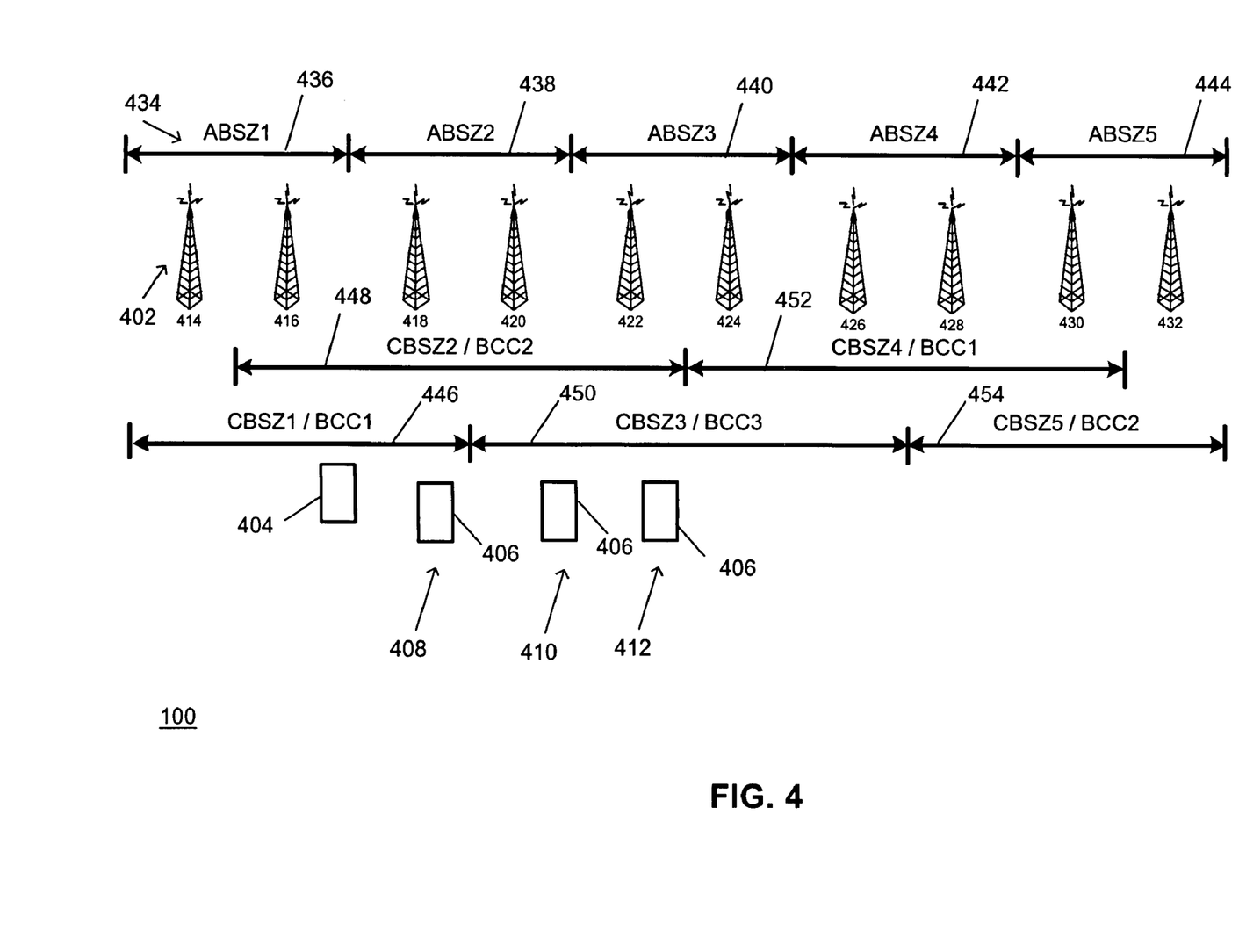
FIG. 4 is a one-dimensional representation of yet another implementation of the assigned broadcast signaling zones and coverage broadcast signaling zones of the apparatus of FIG. 2.

An illustrative description of operation of the apparatus 100 is presented, for explanatory purposes. Turning to FIG. 4, the apparatus 100 in another embodiment comprises an access network 402, an access terminal 404, and an access terminal 406 that moves from a position 408, to a position 410, and then to a position 412. The access network 402 comprises base transceiver towers (BTSs) 414, 416, 418, 420, 422, 424, 426, 428, 430, and 432. The access network 402 in one example comprises a coverage area 434 that is divided into cells, where each BTS serves one cell. The coverage area 434 in one example comprises a plurality of ABSZs, for example, ABSZs 436, 438, 440, 442, and 444 that correspond to a plurality of CBSZs 446, 448, 450, 452, and 454, respectively.

Referring to FIG. 4: ABSZ 436 comprises the cells served by BTSs 414 and 416 and is identified by a zone identifier ABSZ1 and a BCMCS flow identifier BCC1; ABSZ 438 comprises the cells served by BTSs 418 and 420 and is identified by a zone identifier ABSZ2 and a BCMCS flow identifier BCC2; ABSZ 440 comprises the cells served by BTSs 422 and 424 and is identified by a zone identifier ABSZ3 and a BCMCS flow identifier BCC3; ABSZ 442 comprises the cells served by BTSs 426 and 428 and is identified by a zone identifier ABSZ4 and the reused BCMCS flow identifier BCC1; ABSZ 444 comprises the cells served by BTSs 430 and 432 and is identified by a zone identifier ABSZ5 and the reused BCMCS flow identifier BCC2. The access network 402 broadcasts a BCMCS flow with flow identifier BCC1 over CBSZ 446, which comprises cells 414, 416, and 418. CBSZ 448 comprises cells 416, 418, 420, and 422. CBSZ 450 comprises cells 420, 422, 424, and 426. CBSZ 452 comprises cells 424, 426, 428, and 430. CBSZ 454 comprises cells 428, 430, and 432.

The cells 414 through 432, ABSZs 436 through 444, unique zone identifiers (Zone ID), CBSZ 446 through 454, and BCMCS flow identifiers (Flow ID) of a broadcast overhead message (BOM) in one example are configured as:

| Cell | ABSZ | Zone ID | CBSZ | Flow ID |
| --- | --- | --- | --- | --- |
| Cell 414 | ABSZ 436 | ABSZ1 | CBSZ1 | BCC1 |
| Cell 416 | ABSZ 436 | ABSZ1 | CBSZ1, CBSZ2 | BCC1, BCC2 |
| Cell 418 | ABSZ 438 | ABSZ2 | CBSZ1, CBSZ2 | BCC2, BCC1 |
| Cell 420 | ABSZ 438 | ABSZ2 | CBSZ2, CBSZ3 | BCC2, BCC3 |
| Cell 422 | ABSZ 440 | ABSZ3 | CBSZ2, CBSZ3 | BCC3, BCC2 |
| Cell 424 | ABSZ 440 | ABSZ3 | CBSZ3, CBSZ4 | BCC3, BCC1 |
| Cell 426 | ABSZ 442 | ABSZ4 | CBSZ3, CBSZ4 | BCC1, BCC3 |
| Cell 428 | ABSZ 442 | ABSZ4 | CBSZ4, CBSZ5 | BCC1, BCC2 |
| Cell 430 | ABSZ 444 | ABSZ5 | CBSZ4, CBSZ5 | BCC2, BCC1 |
| Cell 432 | ABSZ 444 | ABSZ5 | CBSZ5 | BCC2 |

For example, the access network 402 broadcasts a BCC for ABSZ1 over cells 414, 416, and 418 via the BCMCS flow identified by BCC1. The access terminals 404 and 406 in one example perform a registration with the access network 402 to receive a BCMCS flow. The access terminals 404 and 406 receive a broadcast overhead message (BOM) that comprises the BCMCS flow identifiers of available BCMCS flows for the serving sectors. The broadcast overhead message in one example is described in the 3GPP2 BCMCS standard. For example, the access terminal 404 is located near cell 416 and receives a BOM that comprises flow identifiers BCC1 and BCC2. The access terminal 404 in one example selects the BCC1 or BCC2 based on which cell provides service first. In another example, the access terminal 404 selects the BCC based on the ordering of the BCMCS flow identifiers in the BOM message under the BCMCS program.

Once the access terminal 404 has selected a BCMCS flow identifier, the access terminal 404 in one example registers the BCMCS flow identifier with the access network 402 employing a standard BCMCS flow registration procedure. The access network 402 stores the flow identifier registered by the access terminal 404. The access network 402 also determines and stores the zone identifier that corresponds to the CBSZ from which the BCMCS registration message from the access terminal 404 is received. The access network 402 determines the CBSZ based on the sector that receives the registration message in combination with the BCMCS flow identifier being registered, as shown by the configuration table. Upon registration of the BCMCS flow identifier, the access terminal 404 begins listening to the BCC over the corresponding BCMCS flow. In one example, the access terminal 404 selects the BCC1 flow identifier and registers with the access network 402. In this example, the access terminal 404 may toggle between cells 416 and 418 which belong to two different ABSZs (ABSZ1 and ABSZ2). However, the access terminal 404 can continue to receive the BCC1 for signaling messages no matter which cell becomes the serving cell. The access terminal 404 will only monitor one cell at a time and it may toggle or "ping-pong" between the two cells if the pilot strength for the two are about the same. Since the BCC1 is available from both cell 416 and 418, the access terminal 404 does not need to perform another BCMCS registration when crossing soft zone boundaries, which substantially reduces or eliminates the "ping-pong" effect, as will be appreciated by those skilled in the art.

The access terminal 406 in one example is powered up in position 408, e.g., within cell 418. The access terminal 406 in one example receives a BOM message that comprises the flow identifiers BCC2 followed by the flow identifier BCC1. In this example, the access terminal 406 registers the flow identifier BCC2 since it is first in the flow identifier list. If the access terminal 406 moves to position 410, it is then between cells 420 and 422. While the access terminal 406 may "ping-pong" between the cells 420 and 422, for example, due to changes in signal strength, the access terminal 406 may continue to listen to the signaling messages from BCC2 without notifying the access network 402 that it has moved. In addition, since cell 420 and 422 both broadcast the BCC over the BCMCS flow BCC2, the access terminal 406 in one example can add or softcombine a signal for the BCC2 received from the cell 420 with a signal for the BCC2 received from the cell 422. This allows the access terminal to receive signaling messages at very high data rate relative to the standard control channel. The softcombine capability is described in the BCMCS standard. The signal from the cells 416, 418, 420 and 422, which make up the coverage area of CBSZ2, comprise a single frequency network (SFN) for the BCMCS flow BCC2, so that it can achieve a higher data rate for broadcasting the signaling messages anywhere within the CBSZ2, as will be appreciated by those skilled in the art.

If the access terminal 406 moves to position 412, it is then past the cell 422 and close to cell 424. The access terminal 406 in one example switches to the BCC3 upon any of: receiving a notification from the access network 402; determining that the BCC2 is no longer available (i.e., the BCC2 flow identifier is not found in the more recently received broadcast overhead messages transmitted by cell 424); or the access terminal 406 determines that an error-rate for the BCC over BCC2 is over a predetermined threshold. The access terminal 406 in one example will not switch back to the BCC2 flow until it has moved to cell 418, as it is now near the center of CBSZ3 and CBSZ3 should have good SFN coverage for BCC3 at this point.

An access terminal near a zone boundary (including cases where the access terminal has passed its current ABSZ and has entered another ABSZ slightly) in one example will be able to continuously receive signaling from its current selected BCC as the BCC is still available in the current CBSZ. This is the soft zone boundary effect which helps to maintain the SFN effect for inside the coverage area of the zone and which helps to protect the access channels at zone boundaries without suffering "ping-pong" effect by stationary mobiles right near the boundaries. In one example if the access terminal is stationary or in slow mobility, then there is no need for it to change to the new BCC that is assigned to the new zone, until it is directed by the access network to switch to the new BCC or it has moved deeply into the new zone. This later case is similar to that of a fast moving access terminal, e.g., it will find from the normal BroadcastOverheadMessage carried by the normal EVDO control channel that the old BCC is no longer carried by the new sectors. The access terminal will then pick a new BCC for signaling as directed by the BroadcastOverheadMessage from the normal control channels.

The access network 402 in one example will begin to broadcast signaling messages to the access terminals 404 and 406 upon registration of the flow identifiers. The access terminals 404 and 406 in one example use a Default Signaling Application (with Signaling Network Protocol or SNP) for receiving the signaling messages. The access terminal 404 or 406 listens to the BCC for the signaling messages and they will be routed to the right protocol layer for processing through the Default Signaling Application on the access terminal as specified by the SNP header.

The access network 402 in one example is able to track the access terminals 404 and 406 to the zones within the access network 402. In one example, this allows the access network 402 to limit the participating zones for transmitting signaling messages. Otherwise, these signaling messages are often escalated 'squarely' for the next retry in terms of a number of cells or sectors to be used. The access network 402 can then reach an access terminal and even notify the access terminal using DOS protocol quickly with the BCC by broadcasting to the entire CBSZ in the first attempt (rather than going through traditional escalation procedure from the last seen active-set, to the radio network controller, to the radio network controller group). In addition, this zone tracking property can be used actually to tune the sizes for zones based on the bandwidth required for signaling messages (e.g., a large zone can be used in early release when the number of capable access terminals are limited and the zones will be reduce in sizes as more mobiles starting to use the BCC).

The access network 402 in one example is configured to select, based at least in part on the flow identifier registration by the access terminal 406, a selected BCC of the at least one BCC or another control channel (e.g., the standard EVDO control channel) for sending a signaling message to the access terminal. The access network 402 in one example is configured to send the signaling message to the access terminal over the selected BCC if the flow identifier registered by the access terminal comprises a valid flow identifier (e.g., BCC1, BCC2, etc.). The access network 402 in a further example is configured to send the signaling message to the access terminal over the other control channel if the flow identifier comprises a blank flow identifier, such as BCC0. In one example, the access network 402 employs the blank flow identifier for access terminals that do not support signaling over the BCCs.

Numerous alternative implementations of the present invention exist. The ABSZs and/or CBSZs in alternative examples may comprise different numbers of zones than those shown in FIGS. 2 and 3. Additionally, The ABSZs and/or CBSZs may be different sizes and/or shapes within the same access network 102 or 402. In one example, the access network 102 or 402 (or an operator thereof) may resize or reconfigure the ABSZs and/or CBSZs. For example, early deployments with a low number of compatible access terminals may use larger zones since there would be less signaling over the BCCs. The signaling messages sent over the BCC in one example comprise an incrementing transaction ID, so that access terminals listening to the BCC will know whether they have missed any signaling messages, which may reflect a poor quality of reception. The steps performed by the access network 102 and/or 402 in one example are performed by a radio network controller (e.g., RNC 106), a base transceiver station (e.g., BTSs 108, 110, 112, or 114), or combinations thereof.

The access networks 102 and 402 in one example speed up the signaling for real-time applications/services provided by the access networks 102 and 402 by using the BCMCS flow over a CBSZ to achieve a single frequency network (SFN) effect, which reduces interference and allows softcombining of signals from different sectors. Softcombining the signals in one example allows the access terminals to receive signaling messages at very high data rates The access networks 102 and 402 in one example use fewer resources for signaling by using the ABSZ and CBSZ zones to track down an access terminal's location. For example, upon receipt of the flow identifier registration, the access network 402 can determine which zone the access terminal is located in based on which sector or cell that the registration message came from. This reduces the number of sectors that a signaling message must be sent to for contacting an idle access terminal.

The access networks 102 and 402 in one example solve the "ping-pong" effect that is associated with normal zone based networks: while the access terminals near boundaries of zones will toggle between sectors that belong to different zones, the overlapped signaling area of the CBSZs which completely cover the actual zone will allow the "stationary or slow moving" access terminals to stay with their currently monitored BCC BCMCS flow and to receive signaling message without interruption, even though the access terminals may have passed the zone's boundary and moved into another zone.

The access networks 102 and 402 in one example allow the co-existence of the broadcast control-signaling channel with normal control channel so that from each access terminal's point of view, the AN is completely backward compatible. This is not just for access terminals that are not capable of BCC (e.g., old access terminals or access terminals without the mobile client software). It is also for BCC capable access terminals, especially access terminals that are near the edge of the BCCs coverage areas or simply in uncovered areas. Therefore the access terminal may choose to receive signaling messages from either channel. This allows the access terminal to receive signaling messages in areas that are less useful for broadcasting channels (e.g., very rural areas or coverage edges for RNCs or the access network). For access terminals near coverage area boundaries, the access network in one example uses the normal CC based signaling. Additionally, the BCC capable access terminals may choose to use the normal control channel based signaling when it cannot get good reception for the BCC (for example, by error-rate detection). In another example, the access network uses the normal control channel to send a signaling message to the access terminal's last active set and then follow it with a broadcast to the zone that the access terminal is located in. In this example, there will be no escalation or flooding over the entire coverage area.

The access networks 102 and 402 in one example continue to send messages to the access terminals through the normal control channels, for example: the basic overhead message and other sector-specific messages (e.g., SectorParameter, AccessParameter, etc.) Therefore, the access terminal will continue to monitor the normal control channel for these messages.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
an access network configured to provide a wireless communication service over a service coverage area and is configured to support a broadcast multicast system (BCMCS);
wherein the service coverage area is divided into a plurality of coverage broadcast signaling zones;
wherein each coverage broadcast signaling zone comprises at least one assigned broadcast signaling zone, wherein each assigned broadcast signaling zone is identified by a unique zone identifier and a flow identifier, wherein the assigned broadcast signaling zones cover the service coverage area and do not overlap;
wherein the access network is configured to broadcast a plurality of broadcast control-signaling channels (BCC) over the service coverage area via a plurality of BCMCS flows, wherein each of the plurality of BCMCS flows is identified by a flow identifier;
wherein the access network is configured to broadcast one BCC, of the plurality of BCCs, over each coverage broadcast signaling zone via a BCMCS flow, of the plurality of BCMCS flows, identified by the flow identifier of the assigned broadcast signaling zone that corresponds to the coverage broadcast signaling zone;
wherein the access network is configured to select, based at least in part on a flow identifier registration by an access terminal in the service coverage area, a selected BCC of the plurality of BCCs or another control channel for sending a signaling message to the access terminal.

2. The apparatus of claim 1, wherein the access network comprises an evolution data optimized (EVDO) wireless communication network.

3. The apparatus of claim 1, wherein the plurality of coverage broadcast signaling zones comprise:
a first coverage broadcast signaling zone that comprises a first assigned coverage broadcast signaling zone identified by a first unique zone identifier and a first flow identifier, wherein the access network broadcasts a first BCC via a first BCMCS flow over the first coverage broadcast signaling zone; and
a second coverage broadcast signaling zone that comprises a second assigned coverage broadcast signaling zone identified by a second unique zone identifier and a second flow identifier, wherein the access network broadcasts a second BCC via a second BCMCS flow over the second coverage broadcast signaling zone;
wherein the first coverage broadcast signaling zone partially overlaps the second coverage broadcast signaling zone;
wherein the first assigned broadcast signaling zone does not overlap the second assigned broadcast signaling zone;
wherein the first flow identifier and the second flow identifier are distinct.

4. The apparatus of claim 3, wherein the plurality of coverage broadcast signaling zones comprise:
a third coverage broadcast signaling zone that comprises a third assigned broadcast signaling zone identified by a third unique zone identifier and a third flow identifier;
wherein the first coverage broadcast signaling zone does not overlap with the third coverage broadcast signaling zone;
wherein the first flow identifier and the third flow identifier comprise a same flow identifier.

5. The apparatus of claim 3, wherein the access terminal is registered with the first flow identifier;
wherein the access network is configured to notify the access terminal to register the second flow identifier of the second assigned broadcast signaling zone if the access terminal is located near an edge of the first coverage broadcast signaling zone and near the second assigned broadcast signaling zone.

6. The apparatus of claim 1, wherein the access terminal is located within a first coverage broadcast signaling zone of the plurality of coverage broadcast signaling zones;
wherein the first coverage broadcast signaling zone comprises a first assigned broadcast signaling zone identified by a first unique zone identifier and a first flow identifier, wherein the first flow identifier corresponds to a flow identifier registered by the access terminal;
wherein the access network is configured to send the signaling message to the access terminal over the selected BCC if the first flow identifier comprises a valid flow identifier;
wherein the access network is configured to send the signaling message to the access terminal over the other control channel if the first flow identifier comprises a blank flow identifier.

7. The apparatus of claim 6, wherein the first coverage broadcast signaling zone is located near an outer edge of the service coverage area;
wherein the first flow identifier comprises a blank flow identifier.

8. The apparatus of claim 6, wherein the access network is configured to determine the unique zone identifier of the first assigned broadcast signaling zone of the first coverage broadcast signaling zone that the access terminal is located within through employment of a BCMCS registration message from the access terminal;
wherein the access network is configured to select the selected BCC that corresponds to the unique zone identifier of the first assigned broadcast signaling zone.

9. The apparatus of claim 1, wherein the assigned broadcast signaling zone comprises at least one sector;
wherein the coverage broadcast signaling zone comprises the at least one sector and a plurality of sectors that surround the at least one sector.

10. The apparatus of claim 1, wherein the assigned broadcast signaling zone comprises at least one cell;
wherein the coverage broadcast signaling zone comprises the at least one cell and a plurality of cells that surround the at least one cell.

11. The apparatus of claim 1, wherein the signaling message comprises one of a data over signaling (DOS) message or a page message.

12. The apparatus of claim 1, wherein the access network is configured to resize and/or reconfigure the at least one coverage broadcast signaling zone.

13. The apparatus of claim 1, wherein access network comprises a multi-carrier configuration with at least a first carrier and a second carrier;
wherein the access network employs the BCC for best effort signaling for the first carrier and the second carrier.

14. The apparatus of claim 1, wherein the at least one coverage broadcast signaling zone is configured to provide a single frequency network effect to allow softcombining of the BCC.

15. An apparatus, comprising:
an access terminal configured to receive a wireless communication service within a service coverage area provided by an access network, wherein the access network is configured to support a broadcast multicast system (BCMCS);
wherein the access network is configured to divide the service coverage area into a plurality of coverage broadcast signaling zones;
wherein each coverage broadcast signaling zone comprises at least one assigned broadcast signaling zone, wherein each assigned broadcast signaling zone is identified by a unique zone identifier and a flow identifier, wherein the assigned broadcast signaling zones cover the service coverage area and do not overlap;
wherein the access terminal is located within a first coverage broadcast signaling zone of the plurality of coverage broadcast signaling zones;
wherein the access network is configured to broadcast a plurality of broadcast control-signaling channels (BCC) over the service coverage area via a plurality of BCMCS flows, wherein each of the plurality of BCMCS flows is identified by a flow identifier;
wherein the access network is configured to broadcast one BCC, of the plurality of BCCs, over each coverage broadcast signaling zone via a BCMCS flow, of the plurality of BCMCS flows, identified by the flow identifier of the assigned broadcast signaling zone that corresponds to the coverage broadcast signaling zone;

wherein the access terminal is configured to receive a broadcast overhead message that comprises the plurality of flow identifiers for the plurality of BCMCS flows, wherein the plurality of flow identifiers comprises a first BCMCS flow identifier that corresponds to the assigned broadcast signaling zone of the first coverage broadcast signaling zone;

wherein the access terminal is configured to register the first BCMCS flow identifier to allow selection by the access network of a BCMCS flow for the first coverage broadcast signaling zone that the access terminal is located in;

wherein the access terminal is configured to receive a signaling message over a BCC via the BCMCS flow, of the plurality of BCMCS flows, identified by the first BCMCS flow identifier.

16. The apparatus of claim 15, wherein the broadcast overhead message comprises a first broadcast overhead message;

wherein the access terminal is configured to register a second BCMCS flow identifier upon one of:
 a receipt of a second broadcast overhead message that does not comprise the first BCMCS flow identifier;
 a receipt of an indication from the access network to register the second BCMCS flow identifier; or
 a determination by the access terminal that the BCC comprises an error rate above a predetermined threshold.

17. A method, comprising the steps of:

dividing a service coverage area of an access network that supports a broadcast multicast system (BCMCS) into a plurality of overlapping coverage broadcast signaling zones, wherein each overlapping coverage broadcast signaling zone comprises an assigned broadcast signaling zone, wherein the assigned broadcast signaling zones cover the service coverage area and do not overlap;

assigning a unique zone identifier and a flow identifier to each assigned broadcast signaling zone;

broadcasting a unique broadcast control-signaling channel (BCC) over each of the plurality of overlapping coverage broadcast signaling zones via a plurality of BCMCS flows identified by the flow identifiers of the assigned broadcast signaling zone that corresponds to the coverage broadcast signaling zone;

determining a coverage broadcast signaling zone that an access terminal is located within based on a flow identifier registration by the access terminal;

sending a signaling message to the access terminal over a broadcast control-signaling channel to the coverage broadcast signaling zone via a BCMCS flow, wherein the BCMCS flow is identified by the flow identifier registration.

* * * * *